(12) United States Patent  (10) Patent No.: US 8,054,503 B2
Hiraike  (45) Date of Patent: Nov. 8, 2011

(54) SYSTEM AND A PROGRAM PRODUCT

(75) Inventor: Koou Hiraike, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 914 days.

(21) Appl. No.: 11/971,780

(22) Filed: Jan. 9, 2008

(65) Prior Publication Data

US 2008/0193183 A1  Aug. 14, 2008

(30) Foreign Application Priority Data

Feb. 9, 2007  (JP) .................................. 2007-030683

(51) Int. Cl.
*G06F 15/00* (2006.01)
*H04N 1/04* (2006.01)

(52) U.S. Cl. .......................................... 358/1.9; 358/474

(58) Field of Classification Search .................. 358/471, 358/1.18, 2.1, 1.9, 1.15, 474
See application file for complete search history.

(56) References Cited

U.S. PATENT DOCUMENTS

| | | | | |
|---|---|---|---|---|
| 7,161,693 B2* | 1/2007 | Kizaki et al. | ................. | 358/1.13 |
| 7,209,245 B2* | 4/2007 | Patton | ......................... | 358/1.13 |
| 7,362,456 B2* | 4/2008 | Wanda | .......................... | 358/1.14 |
| 7,587,257 B2* | 9/2009 | Niimi et al. | .................... | 700/138 |
| 2005/0182508 A1* | 8/2005 | Niimi et al. | .................... | 700/138 |
| 2005/0206926 A1* | 9/2005 | Tsuji | .............................. | 358/1.9 |
| 2006/0147186 A1* | 7/2006 | Kasutani et al. | .............. | 386/107 |
| 2006/0279759 A1* | 12/2006 | Choi | ............................ | 358/1.13 |
| 2008/0094659 A1* | 4/2008 | Ito | ................................ | 358/1.15 |
| 2008/0158585 A1* | 7/2008 | Miwa | ........................... | 358/1.13 |
| 2009/0033977 A1* | 2/2009 | Morales et al. | .............. | 358/1.15 |
| 2009/0213437 A1* | 8/2009 | Takeuchi | ...................... | 358/471 |
| 2009/0268236 A1* | 10/2009 | Miyata | ......................... | 358/1.15 |
| 2010/0185587 A1* | 7/2010 | Lovinger | ..................... | 707/660 |
| 2010/0195959 A1* | 8/2010 | Meidar | .......................... | 385/76 |
| 2011/0007338 A1* | 1/2011 | Kawanishi | ................... | 358/1.14 |
| 2011/0013035 A1* | 1/2011 | Kang et al. | ................. | 348/222.1 |

FOREIGN PATENT DOCUMENTS

JP  06-015930 A  1/1994

* cited by examiner

*Primary Examiner* — Jerome Grant, II
(74) *Attorney, Agent, or Firm* — Canon USA, Inc., I.P. Division

(57) ABSTRACT

An apparatus is operable to cause a print unit to generate first printed matter based on a first setting designated by a first designator. The apparatus includes an identifier adapted to identify a second setting that can be utilized in substitution for the first setting, a notifier adapted to notify an operator of information about the second setting identified by the identifier, and a producer adapted to cause the print unit to generate second printed matter based on the second setting designated by a second designator, after notifying the operator of the information.

9 Claims, 17 Drawing Sheets

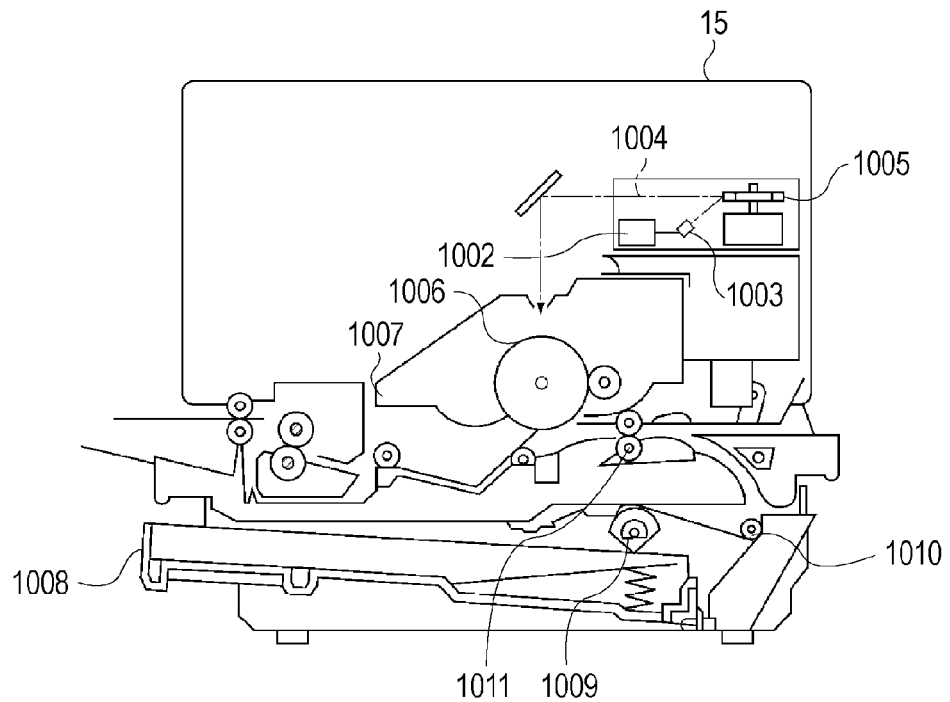

FIG. 19

| RECEIPT NUMBER | TIME AND DATE | JOB NAME | USER NAME | RESULT | RE-PRINTING |
|---|---|---|---|---|---|
| 0001 | 9:00 11/27 | DOCUMENT | SATO | OK | ONE-SIDED PRINTING |

SYSTEM AND A PROGRAM PRODUCT

BACKGROUND OF THE INVENTION

1. Field of the Invention

The present invention relates to an apparatus (e.g., multifunction peripheral device), a system and a program product, used to cause a printing system (e.g., print engine unit contained within the multifunction peripheral device) to produce printed matter.

2. Description of the Related Art

A network printing system that is connected to a personal computer (hereunder referred to as "PC") and a printing device is widely used. At the network printing system, the printing device decodes print data produced by an application of the PC, and bit map data is produced and output. In such a printing system, when printing from the PC, an operation error or a printing setting error at a printer driver may not allow a desired printed result (printed matter) to be obtained.

In this case, upon visually confirming the printed output result, the printing setting is changed at the printer driver of the PC, after which re-printing is performed. Here, it is necessary for a user to obtain the printed output result by returning to the PC from the printing device once and, then, by going back to the printing device from the PC again. This makes it troublesome for the user each time re-printing needs to be performed.

For example, Japanese Patent Laid-Open No. 06-015930 proposes a printing device which can individually perform printing operations on a desired page, included in input data, by an operation of a panel of the printing device, in accordance with a predetermined printing condition that is different from a printing condition up to that time.

However, the related art only allows the printing setting to be changed, and does not propose what printing setting changes can be made.

SUMMARY OF THE INVENTION

An embodiment of the present invention is directed to an apparatus (e.g., multifunction peripheral device) which is operable to cause a print unit (e.g., print engine unit contained within the apparatus) to produce printed matter.

According to an aspect of the present invention, an embodiment is directed to an apparatus operable to cause a print unit to generate first printed matter based on a first setting designated by a first designator. The apparatus includes an identifier adapted to identify a second setting that can be utilized in substitution for the first setting, a notifier adapted to notify an operator of information about the second setting identified by the identifier, and a producer adapted to cause the print unit to generate second printed matter based on the second setting designated by a second designator, after notifying the operator of the information.

Further features of the present invention will become apparent from, for example, the following description of exemplary embodiments and the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 15 shows a structure of a print engine unit shown in FIG. 1.

FIG. 16 shows a second embodiment of an order of priority of the printing setting candidates in Step S207 in FIG. 4.

FIG. 19 is a diagram in which the printing setting candidate in the second embodiment is displayed using an icon.

DESCRIPTION OF THE EMBODIMENTS

Exemplary embodiments of the present invention will now be described in detail with reference to the drawings.

Figure 1:
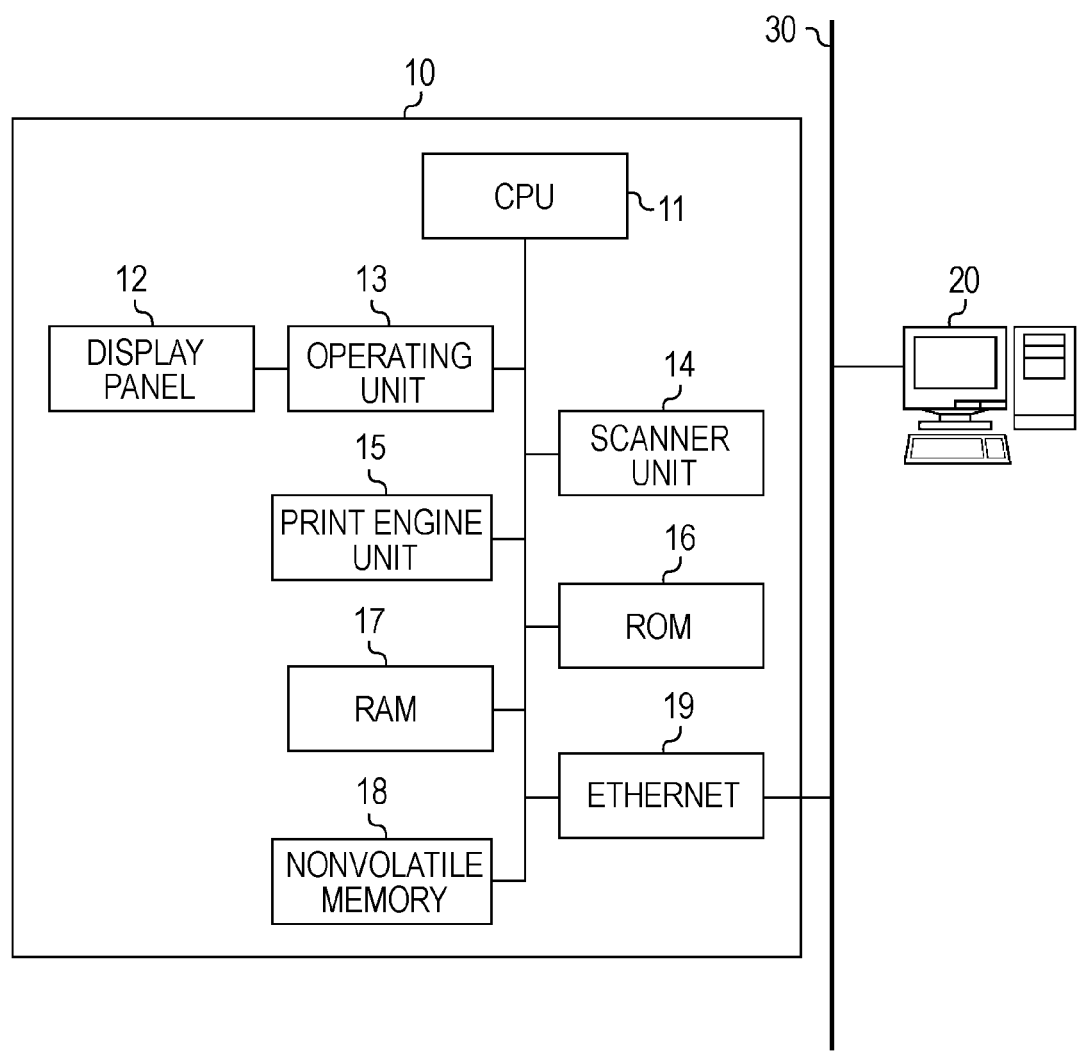
FIG. 1 illustrates a network printing system including a printing device according to an embodiment of the present invention.

FIG. 1 illustrates a network printing system including a printing device according to an embodiment of the present invention.

The printing device according to the embodiment corresponds to a compound device 10 that functions as a copying device, a scanner, a facsimile, and a printer. The network printing system is constructed by connecting the compound device 10 and a PC 20 to a local area network (LAN) 30.

In the compound device 10, a CPU 11 performs the entire controlling operation. A display panel 12 displays, for example, functions and settings. An operating unit 13 is used to allow a user to input operation instructions to a scanner unit 14 or a print engine unit 15, and to input instructions for executing various programs.

The scanner unit 14 reads an image of an original, and converts the image into image data. The print engine unit 15 is used to print and output the image based on the image data. ROM 16 stores control program codes for controlling the CPU 11, the display panel 12, the operating unit 13, the scanner unit 14, and the print engine unit 15.

Using a rewritable flash ROM for ROM 16 makes it possible to update the program codes stored in ROM 16.

In addition to being used as a work memory of the control program codes, RAM 17 is used to temporarily store the image data produced at the scanner unit 14, and the image data to be output to the print engine unit 15.

A nonvolatile memory 18 stores, for example, print data, and comprises, for example, a hard disc (HDD) or a flash ROM. An Ethernet (registered trademark) interface 19 is connected to the LAN 30, and can transmit and receive, for example, print data.

Although, in an embodiment, the compound device 10 is used in the description, a single printer device may be used as the printing device.

For requesting an execution of a printing operation at the compound device 10, the PC 20 can install software (not shown), called a printer driver for producing page description language (PDL) data.

The method of installing the software, such as the printer driver, on the PC 20, will not be described below. It may be the same as the method of installing commercially available application software.

A plurality of printing setting items may be selected via the printer driver. The printing setting items include, for example, a monochrome/color setting, a one-sided/two-sided setting, a setting of the number of pages to be printed on one side, a brightness setting, and a contrast setting. The printer driver makes it possible to perform a printout process in which these printing settings are freely combined.

Figure 2:
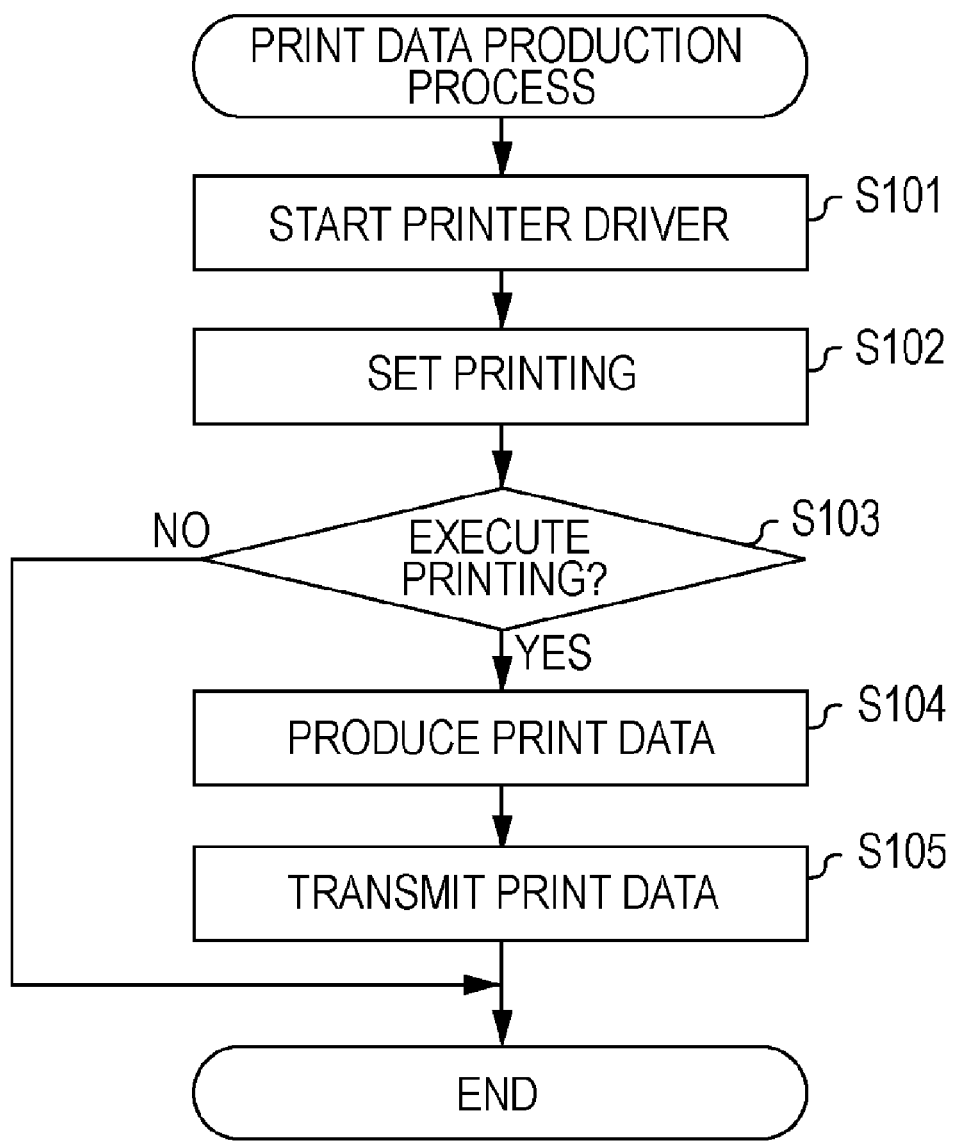
FIG. 2 is a flowchart illustrating a print-data production process procedure executed by a printer driver of a PC shown in FIG. 1.

FIG. 2 is a flowchart illustrating a print data production process procedure executed by the printer driver of the PC shown in FIG. 1.

In FIG. 2, first, the printer driver is started (Step S101). After receiving a printing setting desired by the user (Step S102), a determination is made as to whether or not the user has pressed a printing execution key (Step S103). When the user presses the printing execution key, the production of the print data (also called print job) is started (Step S104). In contrast, if the user presses a cancel key instead of the printing execution key, the procedure of the flowchart is ended.

In Step S104, the printer driver produces print data that reflects the printing setting received in Step S102. The print data generation process is widely known, so that the details thereof will be omitted below. The printer driver produces print data that can be printed at the compound device 10.

In Step S105, the printer driver transmits to the compound device 10, the print data produced in Step S104. Then, the procedure of the flowchart is ended.

Figure 3:
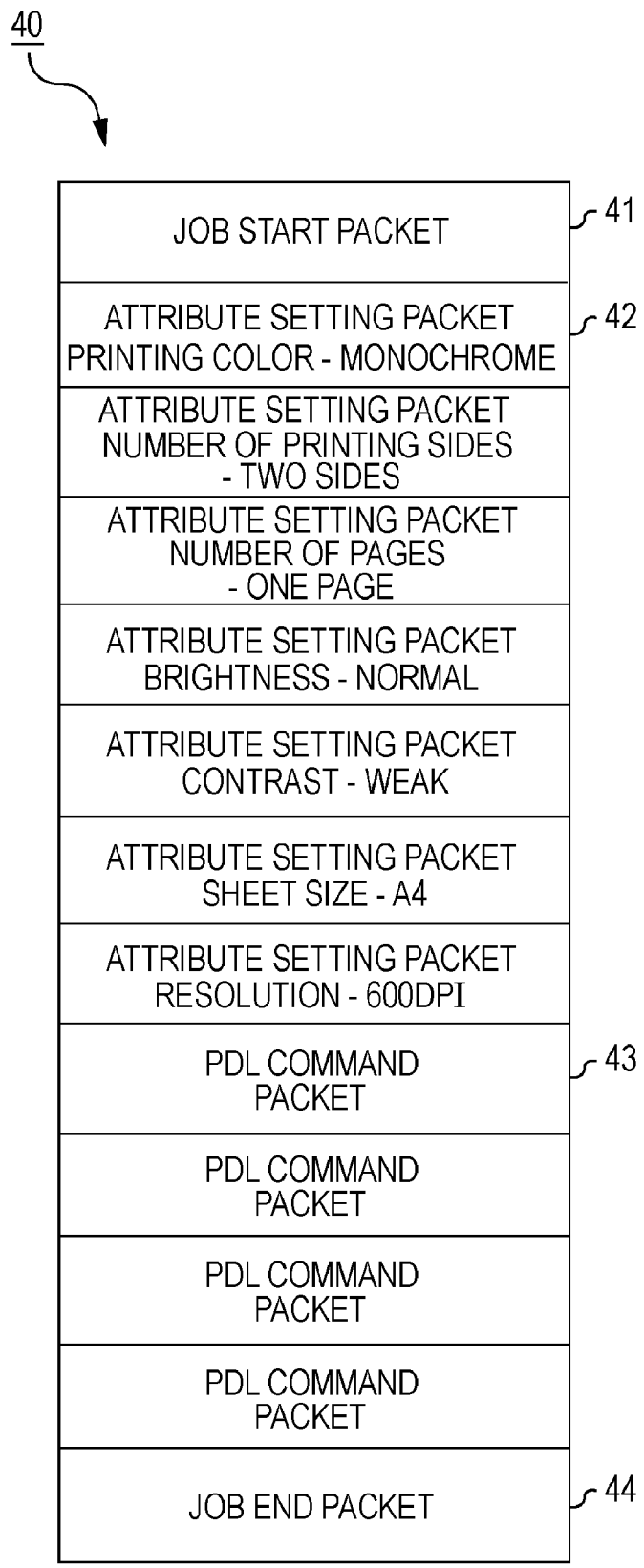
FIG. 3 shows an example of print data produced in Step S104 shown in FIG. 2.

FIG. 3 shows an example of the print data produced in Step S104 shown in FIG. 2.

In FIG. 3, print data 40 is expressed in a format in which the data is divided into packets.

Packet communication is performed by dividing the print data into small items of data to which control information is added, and, then, by transmitting and receiving the divided small items of data. When the print data is transmitted and received as a result of being divided into small items of data, a line is no longer occupied during the communication between two certain points. Therefore, this method has the advantage of allowing a communication line to be used efficiently.

A packet 41 is a packet indicating the start of a print job. A packet 42 is a packet that sets the attributes of the print job, including a monochrome/color setting, a one-sided/two-sided setting, a setting of the number of pages to be printed on one side, a brightness setting, a contrast setting, a sheet-size setting, and a printing resolution setting.

A packet 43 is a packet that stores PDL commands for producing print image data. The PDL commands include, for example, a character-writing command, a figure-drawing command, and an image-drawing command. A typical example of the PDL command is PostScript. A packet 44 indicates the end of the print job.

Figure 4:
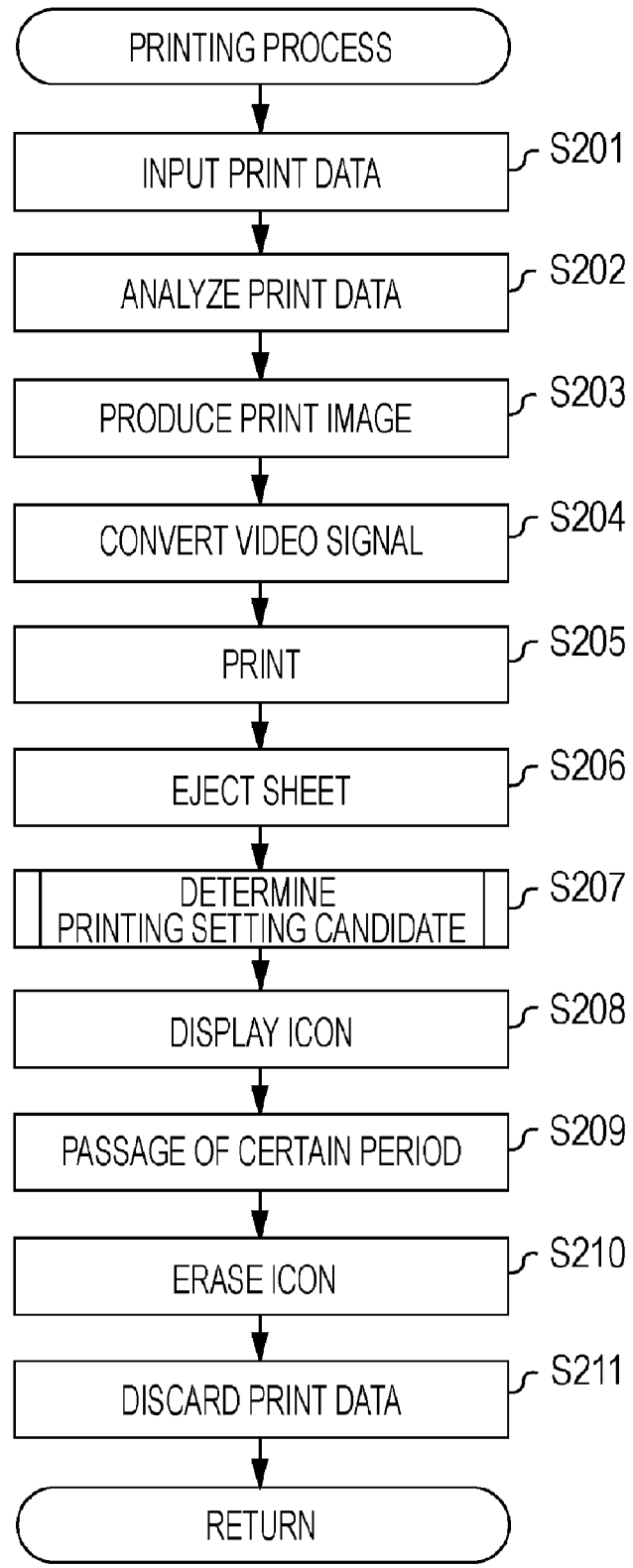
FIG. 4 is a flowchart illustrating a printing process procedure executed in Step S105 shown in FIG. 2.

FIG. 4 is a flowchart illustrating a printing process procedure executed by the compound device 10.

In FIG. 4, first, when the compound device 10 receives the print data 40 (Step S201), the print data is analyzed (Step S202), print image data is produced (Step S203), and the print image data is converted into a video signal (Step S204).

The compound device 10 transmits the video signal to the print engine unit 15 to perform printing (Step S205), after which a printed sheet is ejected (Step S206).

Next, in accordance with the result of the analysis of the print data in Step S202, a determination is made as to whether or not printing can be performed upon changing a printing setting, to determine a printing setting candidate when the printing setting is changed (Step S207).

The compound device 10 displays on the display panel 12 of the compound device 10, a plurality of icons indicating printing setting candidates (Step S208), and waits for a certain period previously set after the reception of the print data (Step S209). Then, in Step S210, the compound device 10 erases the icons displayed in Step S208. Afterwards, in Step S211, the compound device 10 discards the print data received in Step S201, to end the printing process.

Until the icons are erased in Step S210, and the print data is discarded in Step S211, the print data is retained in RAM 17 or the nonvolatile memory 18 of the compound device 10, so that it can be re-used for re-printing. The details of retaining process of the print data will not be given below.

The printing in Step S205 is widely known, so that it will not be described in detail below.

The icons in Step S208 are small pictures indicating, for example, functions and processing contents. Pressing the icons allows instinctive operation, and can simplify a screen display. Although, in the embodiment, functions, processing contents, etc. are indicated by icons, they may be indicated by character strings alone without using icons.

The distinctive features of an embodiment are determining whether or not printing can be performed upon changing a printing setting, to determine a printing setting candidate when the printing setting is changed (Step S207), and displaying the icons indicating the printing setting candidates on the display panel 12 of the compound device 10 (Step S208).

A method of determining a printing setting candidate in Step S207 is described with reference to FIGS. 5, 6, and 7.

First Embodiment

Figure 5:
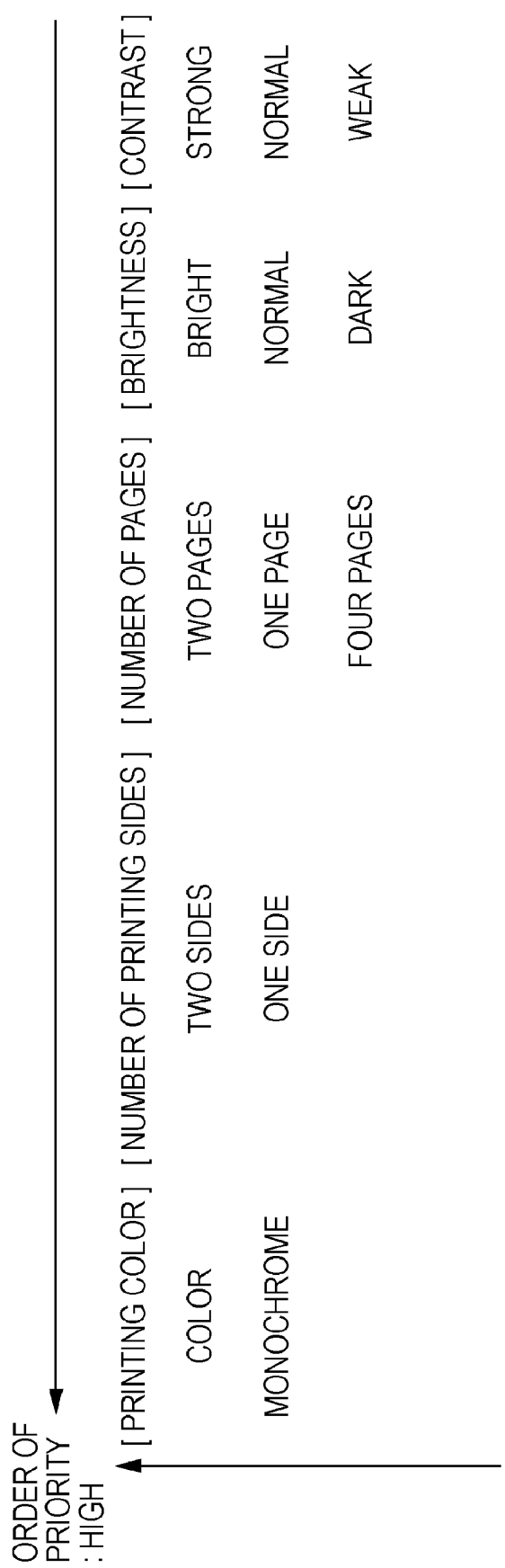
FIG. 5 shows a first embodiment of an order of priority of printing setting candidates in Step S207 in FIG. 4.

FIG. 5 shows an order of priority (first embodiment) of printing settings when determining a printing setting candidate in Step S207 in FIG. 4.

More specifically, FIG. 5 illustrates the order of priority of five settings, that is, a monochrome/color setting, a one-sided/two-sided setting, a setting of the number of pages to be printed on one side, a brightness setting, and a contrast setting. The upper left portion indicates a higher order of priority, and the order of priority decreases towards the right.

A table of the order of priority of the printing setting candidates shown in FIG. 5 are provided in RAM 17 or the nonvolatile memory 18 of the compound device 10, and the results of the analysis of the print data in Step S202 in FIG. 4 are applied to the table. FIG. 5 illustrates that, in the order of priority of the plurality of printing settings in the horizontal direction, a printing setting having a higher priority is selected as a printing setting candidate to be changed. For example, when printing color and the number of printing sides are compared, the printing color is preferentially selected as a printing setting candidate to be changed. In the order of priority of the printing setting values in the vertical direction, a printing setting value having a lower order of priority can be changed to a printing setting value having a higher order of priority. For example, the printing color can be changed from "monochrome" to "color," but cannot be changed from "color" to "monochrome."

Figure 6:
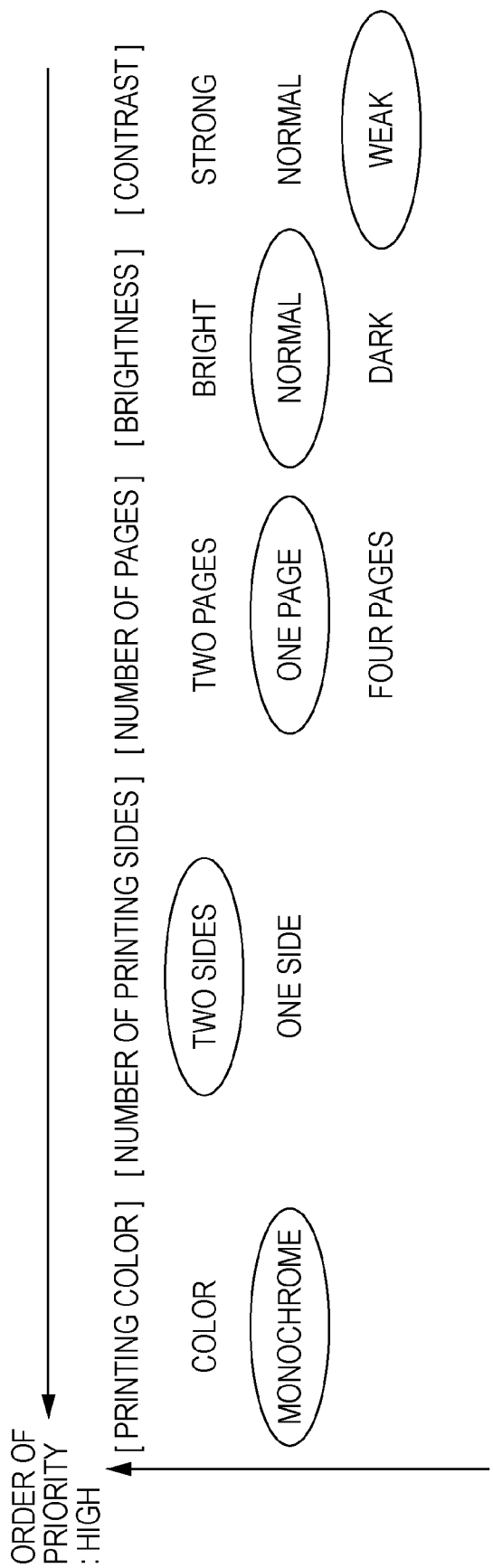
FIG. 6 illustrates an example in which the print data shown in FIG. 3 is applied to the order of priority in FIG. 5.

FIG. 6 illustrates an example in which the print data shown in FIG. 3 is applied to the order of priority in FIG. 5. FIG. 6 shows the results in which the printing setting values designated by the print data 40 in FIG. 3 are applied. The circled printing settings indicate the printing setting values designated at the print data 40.

Figure 7:
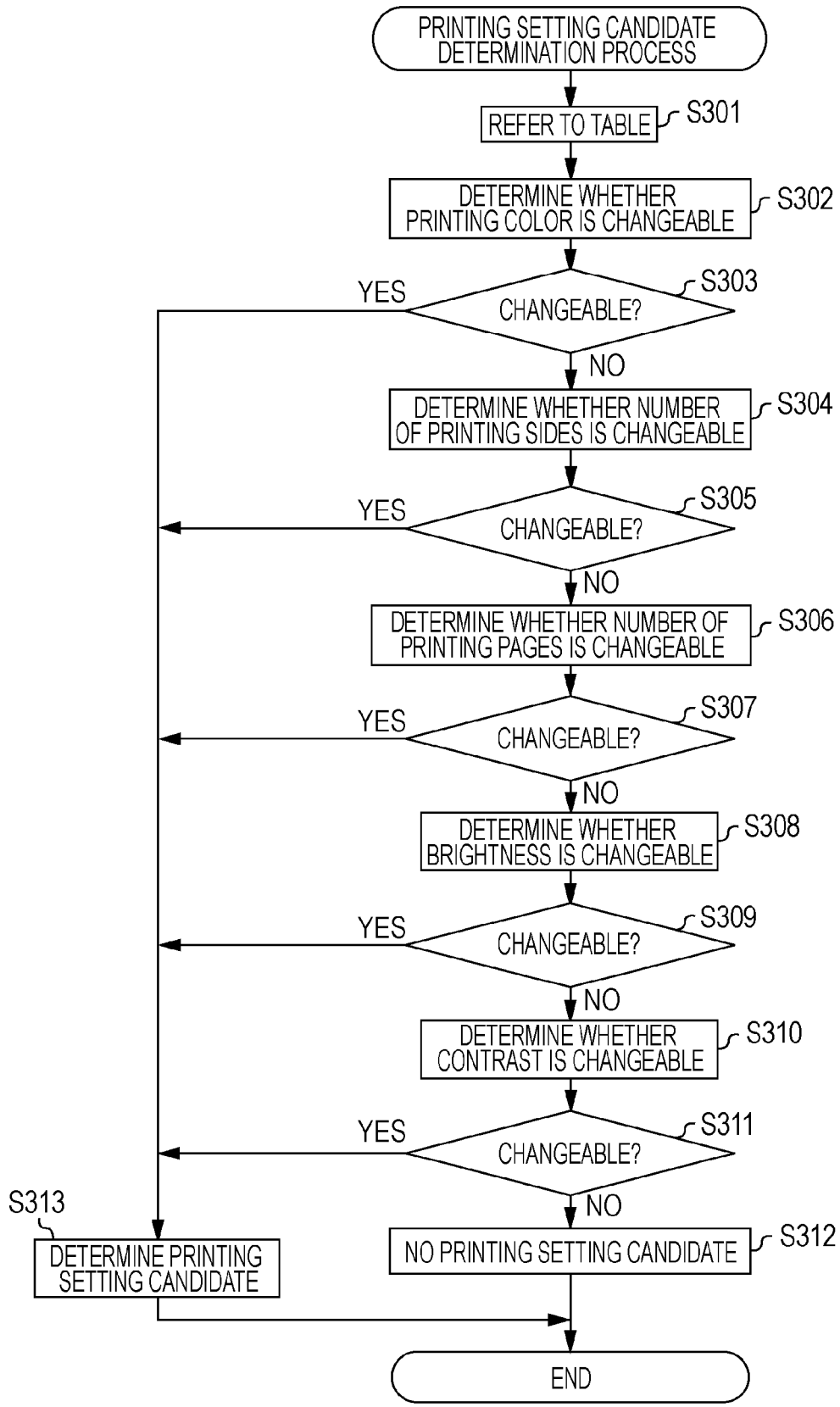
FIG. 7 is a flowchart illustrating a printing setting candidate determination process procedure executed in Step S207 in FIG. 4.
Figure 8:
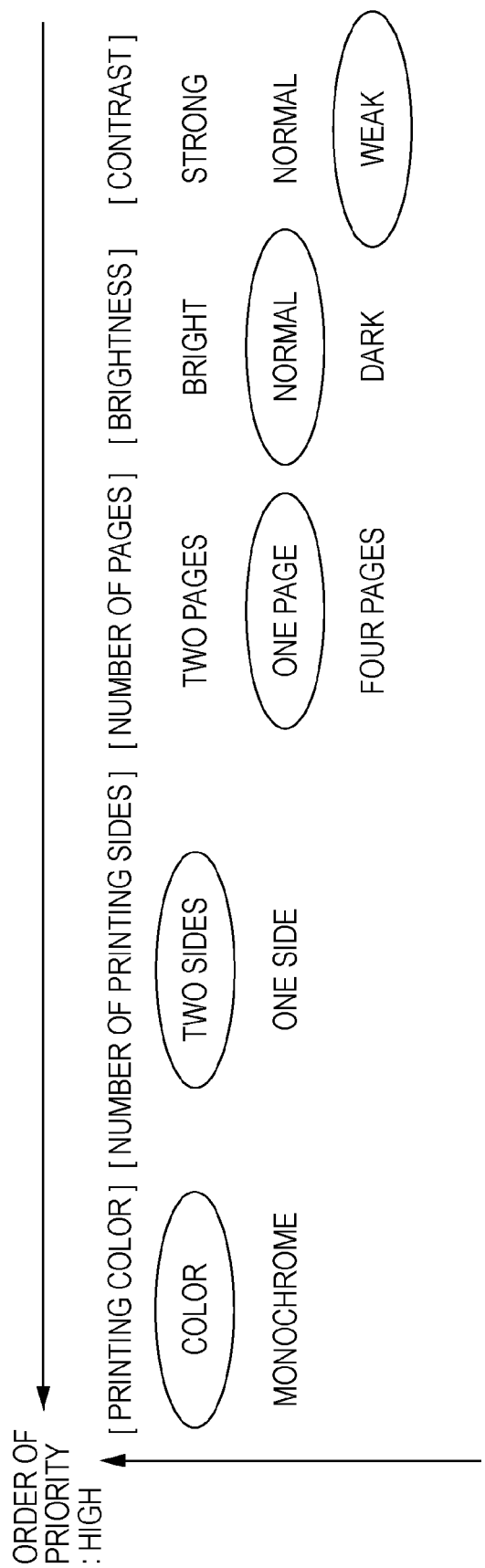
FIG. 8 illustrates a first example of the printing setting candidates in the first embodiment.
Figure 9:
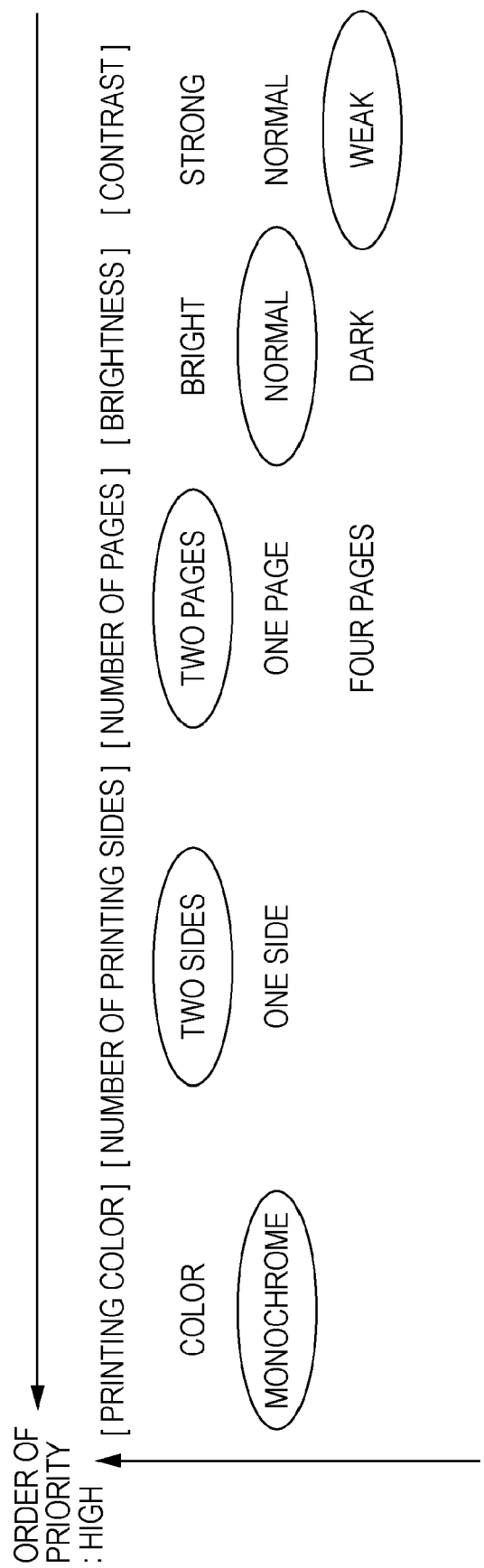
FIG. 9 illustrates a second example of the printing setting candidates in the first embodiment.
Figure 10:
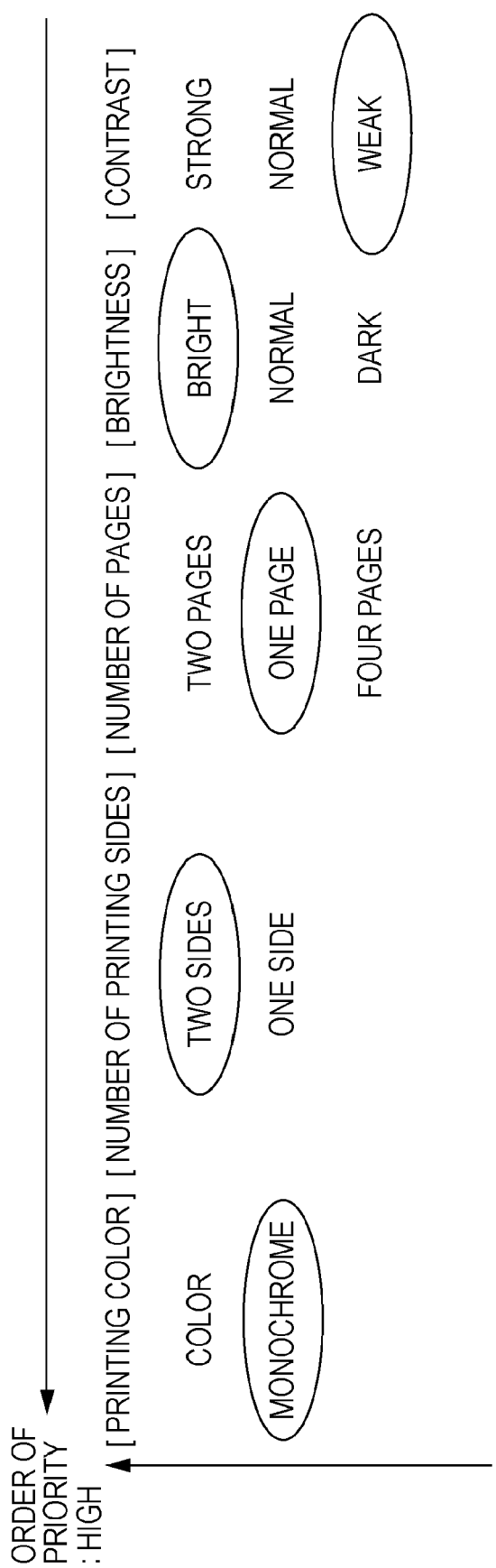
FIG. 10 illustrates a third example of the printing setting candidates in the first embodiment.
Figure 11:
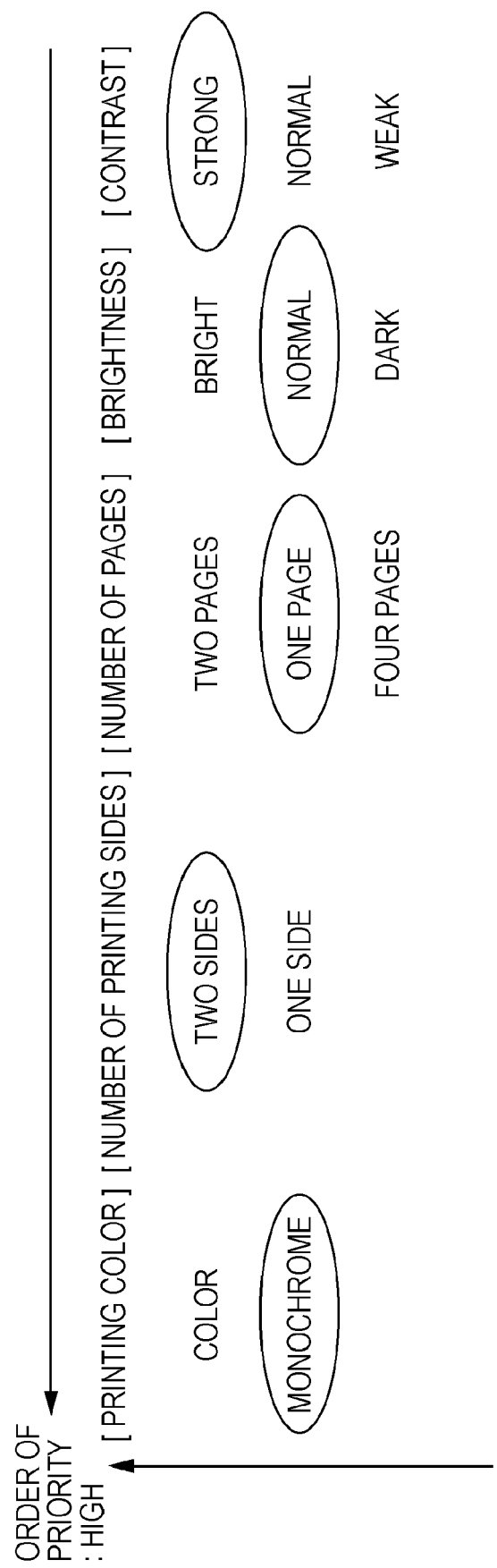
FIG. 11 illustrates a fourth example of the printing setting candidates in the first embodiment.

FIG. 7 is a flowchart illustrating the printing setting candidate determination process procedure executed in Step S207 in FIG. 4.

Referring to FIG. 7, in Step S301, the compound device 10 refers to the table in FIG. 5. Next, in Step S302, the compound device 10 determines whether or not the printing color can be changed on the basis of the results of the analysis in Step S202 and the table in FIG. 5.

For example, when the print data 40 in FIG. 3 is used, monochrome printing is designated, so that it can be changed to color printing. If the print data 40 designates color printing, the compound device 10 determines that the printing color cannot be changed. In the following steps, Steps S304, S306, S308, and S310, similar determinations are made on the basis of the table in FIG. 5.

If, in Step S303, the compound device 10 determines that the printing color cannot be changed, then, in Step S304, it determines whether or not the number of printing sides can be changed. If, in Step S305, the compound device 10 determines that the number of printing sides cannot be changed, then, in Step S306, it determines whether or not the number of printing pages can be changed.

If, in Step S307, the compound device 10 determines that the number of printing pages cannot be changed, then, in Step S308, it determines whether or not the brightness can be changed. If, in Step S309, the compound device 10 determines that the brightness cannot be changed, then, in Step S310, it determines whether or not the contrast can be changed. If, in Step S311, the compound device 10 determines that the contrast cannot be changed, then, in Step S312, it determines that no printing setting candidate is available, to end the procedure.

If the compound device 10 determines that no printing setting candidate is available, the print data is discarded in Step S211 without performing Steps S208 to 210 in FIG. 4.

In contrast, if the compound device 10 determines that a change can be made in any one of Steps S303, S305, S307, S309, and S311, a printing setting that is determined as being changeable is determined as a printing setting candidate (Step S313), to end the procedure.

The order of execution of Steps S302, S304, S306, S308, and S310 in FIG. 7 is based on the order of priority of the printing settings in FIG. 5. Therefore, when the order of priority of the printing settings in the table in FIG. 5 is changed, the order of execution of Steps S302, S304, S306, S308, and S310 is also changed.

In the flowchart of FIG. 7, when one of the printing settings is determined as being changeable, a printing setting candidate is determined. However, a plurality of printing settings that are determined as being changeable upon the execution of all of the Steps S302, S304, S306, S308, and S310 may become printing setting candidates.

The printing setting candidate determination process in FIG. 7 is executed so that the printing setting candidates determined thereby do not overlap, to make it possible to produce different combinations of printing setting candidates.

For example, for the print data 40 shown in FIG. 3, combinations of printing setting candidates that are produced in the operational flowchart of FIG. 7 so that the printing setting candidates do not overlap are shown in FIGS. 8 to 11. Although four printing setting candidates are selected, the number of printing setting candidates that are selected may be changed.

In addition to the printing setting items that are described herein, other printing setting items may also be used, including a print-sheet size setting, a print resolution setting, etc.

Figure 12:
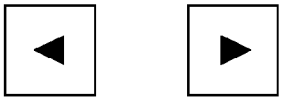
FIG. 12 is a diagram in which the printing setting candidates in the first embodiment are displayed using icons.

Next, FIG. 12 shows an example in which the plurality of printing setting candidates that are determined in Step S313 in FIG. 7 are displayed on the display panel 12 using icons in Step S208 in FIG. 4.

The display panel 12 displays a list of printing history, and comprises an information unit 51 and a re-printing execution unit 52.

The information unit 51 displays printing receipt number, day and date of printing, job name, user name that performed printing, and result of whether or not the printing is successfully carried out. These displayed items are used as information for identifying the print job when performing re-printing. The method of displaying the items on the information unit 51 is widely known, and will not be described in detail below.

The re-printing execution unit 52 displays the printing setting candidates using icons. Icons 53 to 56 are used to display the respective printing setting candidates shown in FIGS. 8 to 11. Pressing the icons 53 to 56 causes a printout process to be performed in accordance with the respective printing setting candidates.

Since there is a difference in the types and numbers of icons that are displayed on the re-printing execution unit 52 in accordance with the printing setting of the print job transmitted from the PC 20, only one icon may be displayed as illustrated by an icon 57.

The operations for performing a printout process as a result of pressing an icon on the re-printing execution unit 52 will be described with reference to FIGS. 13 and 14.

Figure 13:
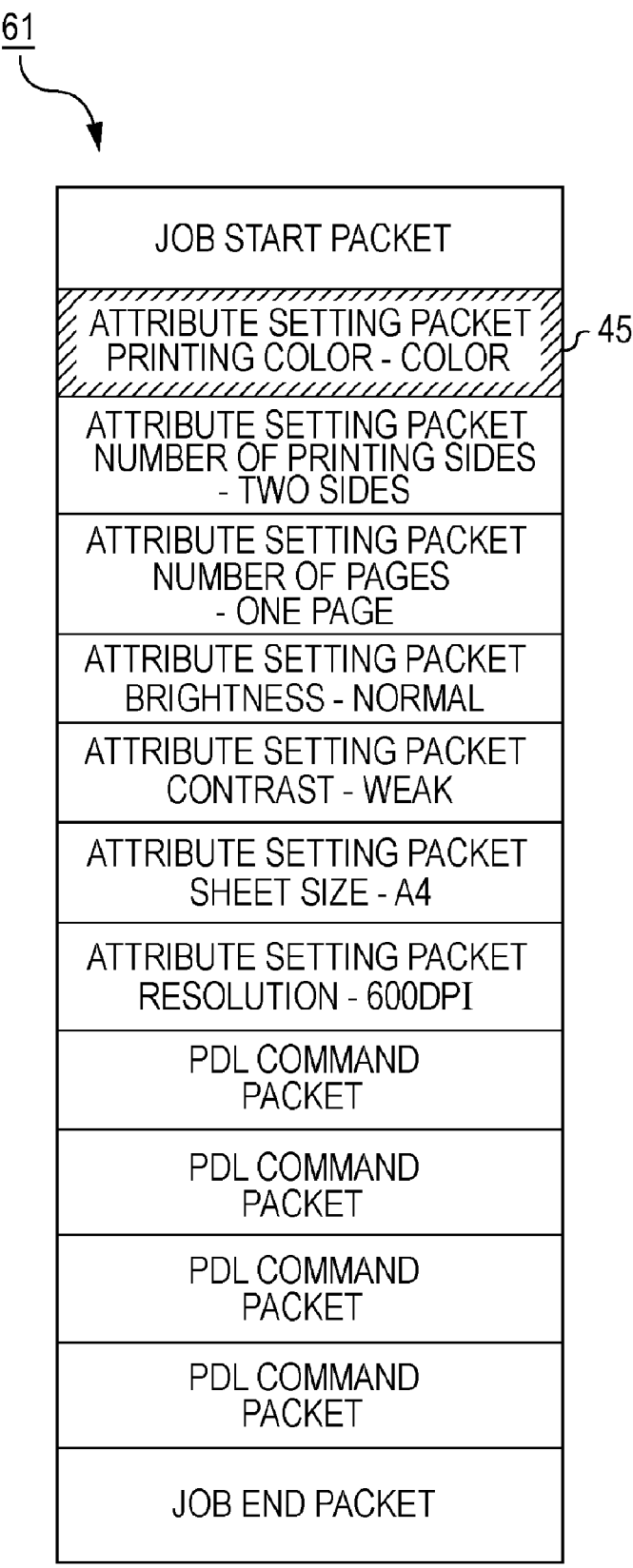
FIG. 13 shows a structure of re-print data when an icon of a re-printing execution unit in FIG. 12 is pressed to perform a printout process.
Figure 14:
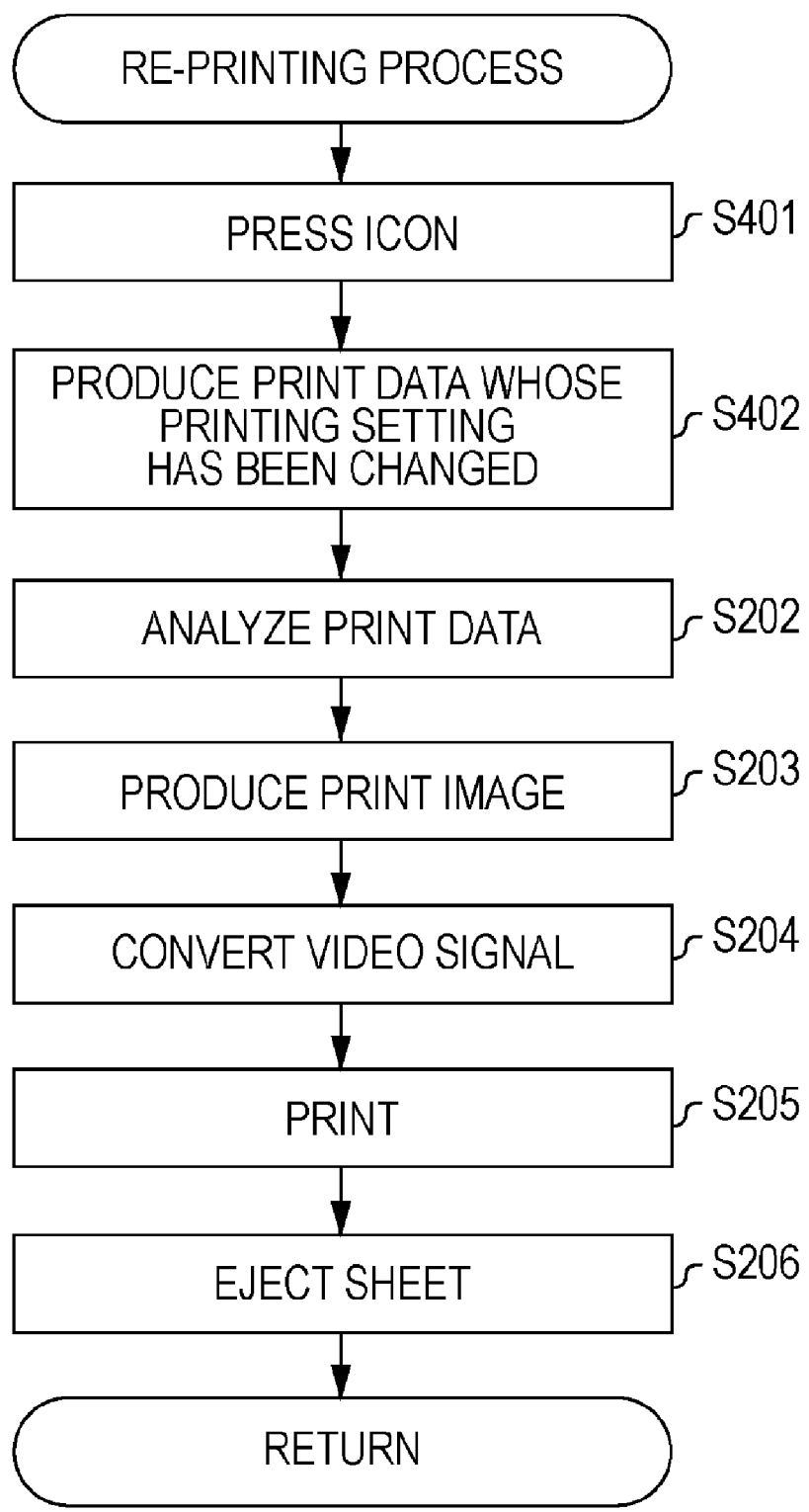
FIG. 14 is a flowchart illustrating a re-printing process procedure when an icon of the re-printing execution unit in FIG. 12 is pressed to perform a printout process.

FIG. 13 shows a structure of print data that is produced when an icon at the re-printing execution unit in FIG. 12 is pressed. FIG. 14 is a flowchart illustrating a re-printing process procedure when an icon on the re-printing execution unit in FIG. 12 is pressed.

When the icon 53 displayed on the re-printing execution unit 52 is pressed, print data 61 shown in FIG. 13 is produced in the compound device 10. Since the printing color at the icon 53 is changed from "monochrome" to "color," a printing-color attribute setting packet 45 designates color printing.

In Step S401, the compound device 10 allows the pressing of an icon displayed on the re-printing execution unit 52.

In Step S402, on the basis of the print data 40 received in Step S201 in FIG. 4 and retained in RAM 17 or the nonvolatile memory 18 of the compound device 10, the compound device 10 produces print data in which the print-color attribute setting packet 45 is changed from "monochrome" to "color."

Then, the printout process is performed through Steps S202 to S206. The operational flowchart of Steps S202 to S206 correspond to that of Steps S202 to S206 in FIG. 4.

FIG. 15 illustrates components of the print engine unit shown in FIG. 1.

A laser beam printing structure, serving as the print engine unit 15 of the compound device 10, and the operation thereof will be described with reference to FIG. 15.

In the print engine unit 15, print image data is converted into a video signal, and the video signal is output to a laser driver 1002. The laser driver 1002 is a circuit for driving a semiconductor laser 1003, and is used to turn on/off a laser beam 1004, emitted from the semiconductor laser 1003, in accordance with the input video signal.

The laser beam 1004 is deflected towards the left or right by a rotatable polygonal mirror 1005, so that an electrostatic drum 1006 is scanned and exposed by the laser beam 1004. This causes an electrostatic latent image of an output image to be formed on the electrostatic drum 1006. The latent image is developed by a developing unit 1007 disposed around the electrostatic drum 1006. Then, the developed image is transferred onto a print sheet.

Print sheets are held in a print-sheet cassette 1008 mounted to the print engine unit 15, are conveyed into the device by a sheet-feed roller 1009 and conveying rollers 1010 and 1011, and are supplied to the electrostatic drum 1006.

The printer to which an embodiment is applied is not limited to a laser beam printer, so that other printers, such as an ink jet printer, a sublimatic printer, and a silver-salt printer, may also be used.

In an embodiment, a plurality of icons that allow outputs in which printing settings are changed at the same time that printing is completed are displayed on the display panel 12 of the compound device 10. Then, a simple operation of selecting and executing the icons makes it possible to perform re-printing of different output results. This makes it possible to increase operability.

Second Embodiment

The purpose of the second embodiment is to allow a printing setting candidate to be customized by a user.

The second embodiment will be described with reference to an example in which five printing settings are changed, that is, a monochrome/color setting, a one-sided/two-sided setting, a setting of the number of pages to be printed on one side, a brightness setting, and a contrast setting. The second embodiment will also be described with reference to an example in which a printing setting candidate is deleted.

FIG. 16 shows an order of priority (second embodiment) when determining a printing setting candidate in Step S207 in FIG. 4.

More specifically, in FIG. 16, the order of priority is changed and a printing setting item is deleted with respect to the order of priority of the printing setting candidates in the first embodiment (FIG. 5).

For the printing color, "monochrome" has a higher order of priority. For the number of printing sides, "one side" has a higher order of priority. For the number of pages to be printed on one side, "one page" has a higher order of priority. For the brightness, the order is with decreasing order of priority, "normal," "strong," and "weak." The contrast is deleted.

Figure 17:
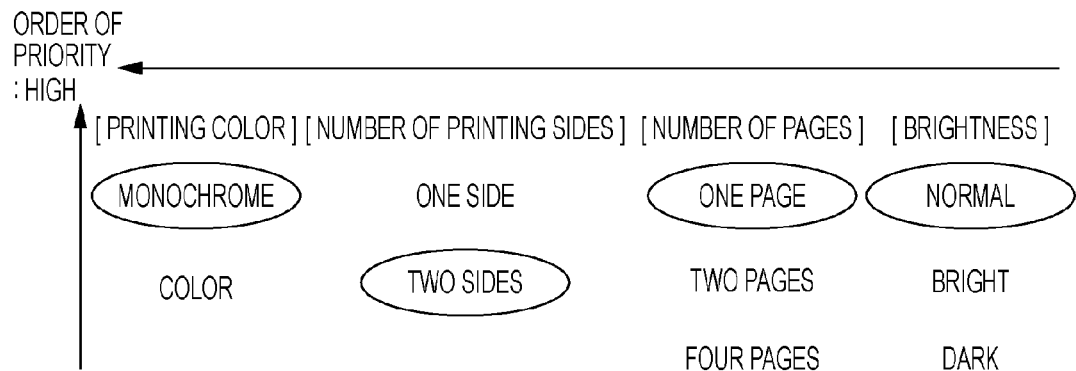
FIG. 17 illustrates an example in which the print data shown in FIG. 3 is applied to the order of priority in FIG. 16.

FIG. 17 illustrates an example in which the print data shown in FIG. 3 is applied to the order of priority in FIG. 16. FIG. 17 shows the result of applying the print data 40 shown in FIG. 3 in the first embodiment to a result in which the order of priority is changed.

Figure 18:
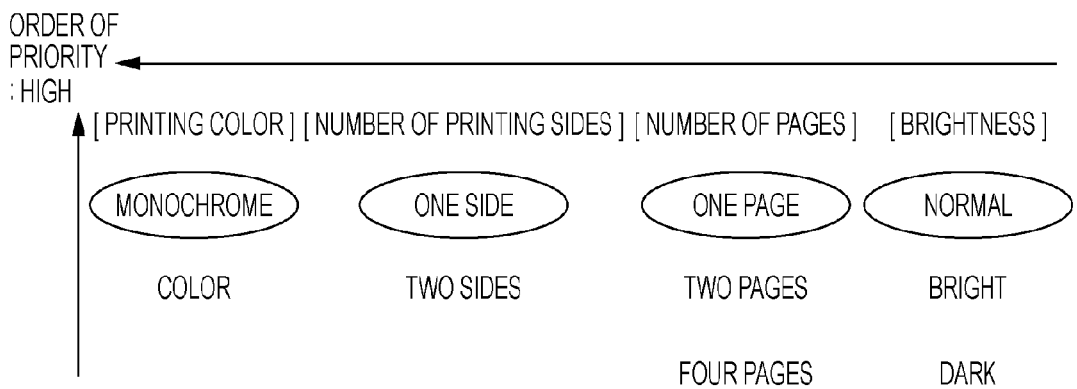
FIG. 18 illustrates an exemplary printing setting candidate in the second embodiment.

The result is that printing setting candidates determined in the operational flowchart in FIG. 7 are reduced to that shown in FIG. 18, so that the number of printing setting candidates becomes 1. An example of an icon display on the display panel 12 is shown in FIG. 19.

Although the operational flowchart for deleting a printing setting candidate and changing the order of priority in the embodiment is not shown, it can be set by using the operating unit 13 and the display panel 12 of the compound device 10.

In the second embodiment, customizing a printing setting candidate makes it possible to change the type of printing setting candidate displayed on the re-printing execution unit 52 and to increase and decrease the total number of printing setting candidates.

The purpose of the present invention is achieved by executing the following processing. That is, it is achieved by supplying to the system or the device, the storage medium that records the program codes of the software for realizing the functions according to the above-described embodiment; and by causing the system or the computer (or CPU or MPU, etc.) of the device to read out the program codes stored in the storage medium.

In this case, the program codes, themselves, read out from the storage medium realize the functions according to the above-described embodiments. The program codes and the storage medium that stores the program codes constitute the present invention.

Examples of the storage medium for supplying the program codes include a floppy (registered trademark) disc, a hard disc, a magneto-optical disc, a CD-ROM, a CD-R, a CD-RW, a DVD-ROM, a DVD-RAM, a DVD-RW, a DVD+RW, a magnetic tape, a nonvolatile memory card, and ROM. In addition, the program codes may be downloaded through a network.

The present invention includes the case in which the functions according to the above-described embodiments are realized by executing the program codes read out by the computer. The present invention also includes the case in which the functions according to the embodiments are realized by causing, for example, an operating system (OS), which operates at the computer, to perform some or all of the actual operations on the basis of the instructions of the program codes.

Further, the present invention includes the case in which the functions according to the above-described embodiments are realized by the following operations. That is, the program codes read out from the storage medium are written to a memory including a function expansion unit, connected to the computer, or a function expansion board, inserted in the computer. Then, for example, the CPU, provided at the function expansion board or the function expansion unit, performs some or all of the actual operations on the basis of the instructions of the program codes.

As described above, even if an erroneous setting or an erroneous operation is performed, using the printing system according to the embodiment including the compound device 10 makes it possible to perform re-printing, so that what types of printing setting changes can be performed when performing re-printing can be presented. Accordingly, a structure that provides this advantage and that is highly operable can be provided.

The present invention is not limited to the above embodiments, and various modifications (including organic combinations of embodiments) can be made without departing from the scope of the invention, and are not excluded from the scope of the invention.

Various examples and embodiments of the present invention have been described. It is apparent to those skilled in the art that the scope of the invention is not limited to a specific description in the specification, but is defined by the following claims.

The scope of the following claims is to be accorded the broadest interpretation so as to encompass all such equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the priority from Japanese Patent Application No. 2007-030683 filed Feb. 9, 2007, which is hereby incorporated by reference herein in its entirety.

What is claimed is:

1. An apparatus operable to cause a print unit to generate first printed matter based on a first setting designated by a first designator, the apparatus comprising:

an identifier adapted to identify a second setting that can be utilized in substitution for the first setting;

a notifier adapted to notify an operator of information about the second setting identified by the identifier; and a producer adapted to cause the print unit to generate second printed matter based on the second setting designated by a second designator, after notifying the operator of the information.

2. The apparatus according to claim 1, wherein the notifier is adapted to notify the operator of the information automatically, in response to producing the first printed matter by the print unit.

3. The apparatus according to claim 1, wherein the notifier is adapted to cause a user interface to display an icon that functions as the second designator.

4. The apparatus according to claim 3, further comprising an ender adapted to end the display of the icon automatically, if the display of the icon exceeds a predetermined period.

5. The apparatus according to claim 3, wherein the print unit is adapted to generate the second printed matter by using print data utilized in producing the first printed matter, the print data being erased with an ending of the display of the icon.

6. The apparatus according to claim 1, wherein the notifier is adapted to make a notification of information about plural candidates as the other setting, automatically.

7. The apparatus according to claim 1, wherein the first designator is provided in a remote user interface.

8. The apparatus according to claim 1, wherein the print unit is included in the apparatus.

9. A program product stored in a non-transitory computer-readable storage medium, the program product including a program code for causing an apparatus to perform a method for causing a print unit to generate first printed matter based on a setting designated by a first designator, the method comprising:

driving a notifier adapted to notify an operator of information about another setting that can be utilized in substitution for the setting, the other setting being identified by an identifier adapted to identify the other setting that can be utilized in substitution for the setting; and causing the print unit to generate second printed matter based on the other setting designated by a second designator, after notifying the operator of the information.

* * * * *